Oct. 1, 1957

H. L. FUSTON 2,808,477

ROLLER CAM

Filed May 7, 1953

INVENTOR:
HOWARD L. FUSTON
BY
Kent W. Womrall
ATT'Y

United States Patent Office 2,808,477
Patented Oct. 1, 1957

2,808,477

ROLLER CAM

Howard L. Fuston, Oak Park, Ill.

Application May 7, 1953, Serial No. 353,638

1 Claim. (Cl. 200—21)

This invention relates in general to a cam which can easily and economically be made to function more preferably than cams now commonly used. This new type of cam is particularly useful where it must be practically perfect to best perform the required duty. The cam is so perfect in its function that for required illustration, its use in a circuit breaker is described in detail.

In a circuit breaker for use in a distributor or a magneto, it is very desirable to separate the ignition points the same distance at each break, and to maintain the desired amount of separation of the ignition points for a long period of time.

This invention relates in general to an improved form of cam having the principle of a roller (or ball bearing) having the rollers (or balls) to perform the duty of commonly used cam lobes to activate a trigger or plunger at desired intervals and for a desired distance. This invention provides a simple but an extremely accurate way to produce a needle roller bearing cam.

An important object of the invention is to provide a floating roller bearing cam which functions in an extremely accurate manner for a long period of use, because rollers are the activating surfaces which are constantly rotating, thereby avoiding pitting or fast wearing of the cam surfaces.

A further object of the invention is to provide roller cam lobes mounted to float with the travel of a distributor shaft, hence this shaft need not have a practically perfect travelling radius of that part to which the cam is attached.

Another object of the invention is to provide cam lobes to perfectly activate a plunger which may separate ignition points although a distributor shaft is not necessarily held in a true travelling radius. This may be accomplished by fastening the ignition points upon a part of the outer roller bearing race.

A further object of the invention is to provide for the turning at all times of the inner roller bearing race and as the roller cam lobes are revolving when activated, the impact upon the wearing surfaces of the inner roller race by its constant rotation allows an almost indefinite perfect surface on the inner race giving it an exceedingly long functional life.

A further object of the invention is to keep the cam rollers or lobes in the desired position to accurately separate ignition points at the exact time desired, and yet to put very little strain on the roller bearing as the rollers in the bearing are pushed between the two bearing races and the part that pushes the rollers is not subject to any shock or strain except the slight strain of pushing the rollers that act as the cam lobes.

A further object of the invention is to provide inner and outer bearing races which are allowed to float which allows for inexpensive manufacturing tolerances and still the cams will indefinitely function perfectly because the ignition points operated thereby are fastened to part of the bearing and hence to always maintain the same distance from the rollers that form the cam lobes.

A still further object of the invention is to provide means for keeping the rollers turning at all times in addition to their turning when performing their activating duty.

A further object of the invention is to provide means for pushing rollers that operate as extremely accurate cam lobes and cause a strain on the mechanism or driving gear which is relatively so little that a porous material of oil absorbing qualification may be used to furnish perfect lubrication for a long period of time without need of replenishing the lubrication.

A further object of the invention is to provide means for an extremely fast and accurate separation of ignition points as compared to the time required by the use of commonly used cams as the cam rollers turn and engage a roller at the end of a plunger which also turns at the time of activation, and the speed of distributor shaft is sufficient to cause the plunger roller actually to bounce apart and away from the cam roller. This bouncing action separates the ignition points so quickly that the arcing time of the current flowing through the points is greatly reduced.

Other objects of the invention are to provide for an extremely fast closing of the ignition points because the cam rollers and the plunger roller may be made of hard material, and a return spring of great compression may be used without quickly causing any wear which would effect the desired amount that the points are to be separated; to consume as little time as possible in the break and make of a circuit breaker so that more time is allowed between the make and break for a full saturation of an ignition coil; to provide greater allowable spring tension which holds the ignition points firmly together during the time of dwell and practically stops any fluttering of the ignition points; and by providing greater spring tension to allow the speed of the distributor shaft to be greatly increased without causing the circuit breaker to lose its perfect functional duties.

Other objects of the invention will appear in the specification and will be apparent from the accompanying drawings in which, Fig. 1 is a perspective view of a distributor with a circuit breaker mechanism activated by a roller bearing cam in accordance with this invention.

Figure 1:
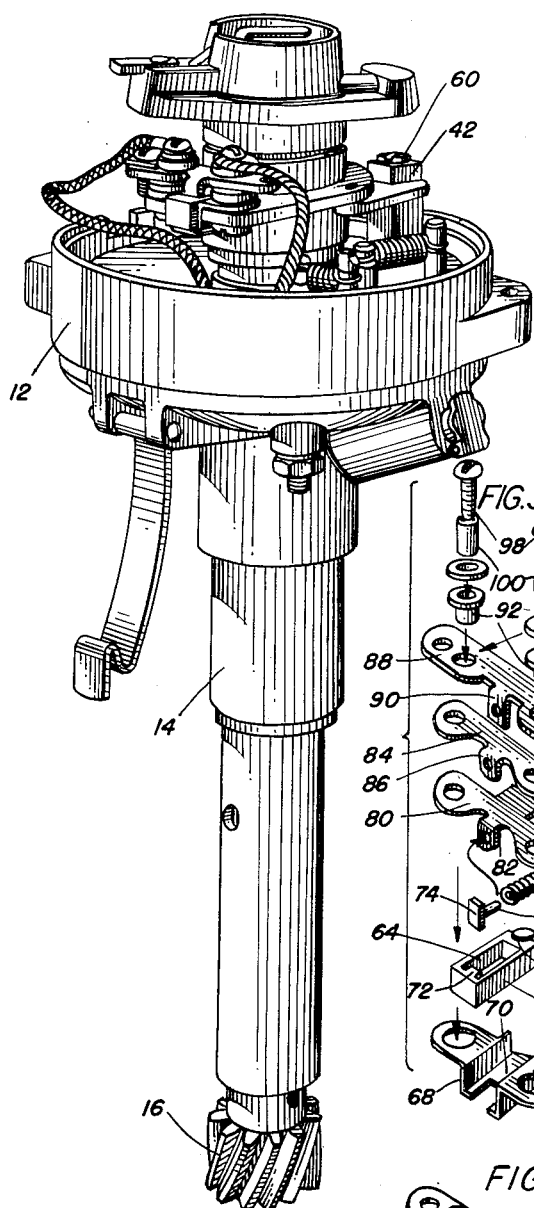
Figure 2:
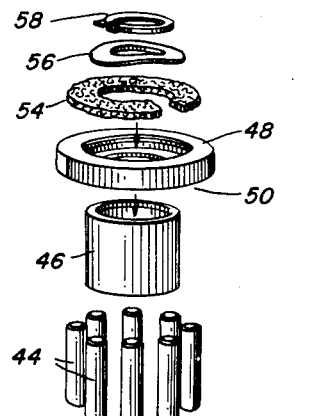
Fig. 2 is an exploded view of parts of the distributor shaft of Fig. 1 shown in perspective and including driving means and roller races in making a roller cam to be used as a circuit breaker for an ignition distributor.

Although this mechanism is extremely accurate as an operating cam, it is inexpensive to make and will last for a long period of use. There are mnay uses where this accurate mechanism is very desirable and one of these uses is herein described in connection with a distributor for an internal combustion engine which uses electric sparks between spark plug electrodes to ignite the fuel mixture in the engine when the piston is in an exact desired position. The roller cams strike a roller in the end of a plunger and separates a movable ignition point from a fixed point. When the points are separated, a spring returns the points quickly together until they are separated by the next cam roller. This quick separation of the ignition points and the quick return is very desirable because the arcing time of the circuit is reduced at each separation of the points and the existing quick return allows more time for ignition coil saturation before the next break of the current.

Referring now more particularly to the drawings, a distributor shaft 10 is mounted to rotate in a housing 12 which is supported at the upper end of a sleeve 14 through which the distributor shaft extends. At the lower end of the shaft is a gear 16 for rotating the shaft in the sleeve and housing.

Attached to the shaft 10 by a collar 17 in the housing is a circular plate 18 extending outwardly therefrom and having opposite driving pins 20 (only one shown) projecting upwardly from the plate.

Mounting upon the plate 18 and surrounding the shaft is a roller gear driver comprising an annular plate 22 with opposite holes 24 (only one shown) therein adapted to fit over the pins 20 on the plate 18 to rotate the driver whenever the shaft is rotated. Extending upwardly from the plate 22 are a plurality of driving arms 26 which are segmental portions of a ring or sleeve slotted at 45° intervals to produce a plurality of driving slots 28 between the segments of the ring formed by the arms. Each arm has a thicker outer portion 30 which extends upwardly from the plate 22 a short distance, and the arms are all firmly secured to the plate 22.

An outer bearing race 32 in the form of a sleeve has an internal diameter such that it fits closely about the outer projections 30 at the lower ends of the arms 26 so that the roller bearing driver is freely rotatable therein. At one side of this bearing race 32 is an opening 34 extending entirely through it and having projections 36 secured to the outside of the bearing race 32 with inner edges 38 parallel with the outer corresponding edges of the opening 34. Extending oppositely from the bearing race 32 are spaced projections 40 which are adapted to embrace a post 42 secured in the housing 12 outside of the outer periphery of the plate 18 and constituting a stop for preventing the rotation of the bearing race 32.

In the slots 28 of the driver, a plurality of roller bearings 44 are inserted from the top of the outer bearing race 32, corresponding in number to the number of the slots and the diameter of these bearings is such that they fit rotatably but without lost motion in the slots and are held in place on the inside by an inner bearing race 46 which surrounds the shaft, but is freely rotatable with respect to it. The roller bearings 44 engage the inner bearing race 46 and the outer bearing race 32 and are driven by the arms 26 of the driver as the distributor shaft 10 is rotated. The engagement of the roller bearings with the bearing races causes them to be rotated, thus presenting new contact surfaces of the roller bearings as they pass the opening 34.

The lower ends of the roller bearings 44 thus engage the top of the plate 22 and at the top of the bearings is an oil cup 48 which has a lower flanged edge 50 which fits within the top of the outer bearing race 52 while the outer flange of the cup is substantially flush with the top of the outer bearing race 32 so that the flanged edge 50 extends against the upper ends of the driving arms 26 to hold the roller bearings in place. Within this oil cup is an oil pad 54 held in place by a spring tension washer 56 and a spring lock ring 58 which extends into a groove 60 on the upper end of the shaft 10 for releasably holding the oil cup and the entire roller mounting and assembly in place on the shaft.

The diameter of the inside of the outer bearing race being a little larger than the diameter of the flanged edge 50 and the thicker portion of the driving arms at the outer projections 30 and the outer diameter of the inner bearing race being a little less than the inside diameter between the driving arms, and the inner diameter of the inner bearing race being greater than that of the diameter of the distributor shaft 10 and the collar 17 by which the plate 18 is attached to the shaft, allows for a slight floating action of the entire roller bearing except for the driver as the projections 36 which form a timing bracket attached to the outer bearing race 32 providing a slot which receives the post 42 therebetween, and also the post 42 has an attaching stud 60 which extends through a longitudinal hole therein and into a fixed plate at the bottom of the housing 12, this hole in the stud being sufficiently large to allow the post 42 to turn about this stud. Thus the projections 40, the post 42 and the stud 60 form a floating type of timing bracket that prevents the outer bearing race 32 from rotating when the distributor shaft turns.

As the rollers 44 are pushed between the inner and outer bearing races by the rotation of the driving arms 26 and the rotation of the shaft 10, the rollers are caused to turn continually upon their own axes producing a slow turning of the inner bearing race 46. This causes each of the rollers to move past the opening 34 of the outer bearing race and the independent rotation of each cam roller brings a different portion of the surface thereof opposite this opening at each rotation of the shaft.

Figure 3:
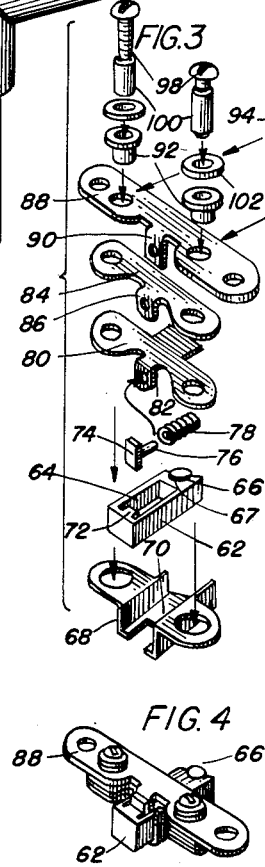
Fig. 3 is an exploded view of parts in perspective which when connected together will form an ignition point assembly having an end roller adapted to be used and movable into contact with the cam rollers when the distributor shaft is turned.
Figure 4:
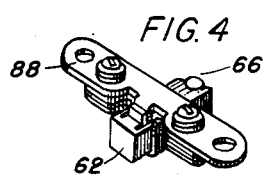
Fig. 4 is a perspective view of the point assembly parts shown in Fig. 3 ready to be attached to the outer roller cam race member.

A removable point assembly as shown in Fig. 4 is mounted between the inner edges 38 of the projections 36 of the outer bearing race 32. It comprises the separate parts shown in Fig. 3, with a plunger 62 somewhat rectangular in shape having an inner recess 64 and a contact roller 66 mounted in a circular seat 67 at one end of the plunger. This end of the plunger and the roller are of a size to extend freely through the opening 34 and the sliding support for the plunger comprises an open rectangular mounting bracket 68 with a rectangular open guideway 70 in which the plunger fits and is slidable.

In the recess 64 of the plunger 62 is an ignition point 72 at the end opposite the roller 66. Also located in the recess is a relatively fixed ignition point 74 having a stem 76 projecting therefrom and serving as a guide and retainer for a coil spring 78. One end of the coil spring bears against the recess adjacent the contact roller 66 and tends to hold the ignition contact 72 against the supported ignition contact 74. Overlapping the top open side of the mounting bracket 68 is a plate 80 having a downwardly turned projection 82. An insulating plate 84 having a downwardly turned perforated projection 86 is substantially of the shape of the plate 80 and its projection 82 and fits closely over the plate 80. A mounting plate 88 having a downward projection 90 also conforms to the insulation and the plate 80 and tightly fits upon the insulation.

This brings the perforated projections 82, 86 and 90 into alignment and the stem 76 of the fixed ignition point 74 extends through the registering perforations for securing this ignition point in place and to the projections, the inner end of the stem engaging one end of the spring 78 as previously set forth. The bracket 68, the plates 80 and 88 and the insulation 84 are provided with registering perforations through which flanged insulating sleeves 92 extend, the lower ends of the sleeves being seated in recesses 94 of the projections 36. At the bottom of each recess is a threaded opening 96 for receiving a stud 98 which extends through an insulating sleeve 100, this sleeve also extending through the flanged sleeve 92 and through a washer 102. The stud clamps the insulating parts together and also locates all of the point assembly parts upon the projections 36 in a unitary condition with the mounting bracket 68 disposed within the inner spaced edges 38 so that the contact roller 66 is in a position to be engaged by the rollers 44 as the shaft 10 is rotated. In actual practice, the parts of the point assembly are separately assembled and held together by the hollow rivets 98 so that it is necessary only to apply the point assembly to the projections 36 and thus to mount the point assembly in place.

The plunger contact 72 and the relatively fixed contact 74 are normally held together by the spring 78 and the movement of the plunger 62 by the engagement of any one of the rollers 44 with the plunger contact roller 66 causes the separation of the ignition points and causes a spark in a well known manner.

The cam rollers 44 and the plunger roller 66 being of a very hard material and rotating at the time of impact, allows the return spring 78 of the desired tension to return the plunger quickly and hold the ignition points firmly together so that no pitting or excess burning occurs over a long period of time. Since the point assembly is attached to the outer race of the roller bearing, it forces the equal activation of the plunger roller by each cam or bearing roller whether the distributor shaft is actually true or not.

The driving arms 26 do not receive any impact as they only push the cam rollers around which allows for the use of porous oil retaining material that easily furnishes lubrication for a long period of use.

While this extremely accurate roller cam is shown as applied to a distributor which activates the plunger at every 45° of rotation of the distributor shaft, it is necessary only to change the slots in the driver to activate the plunger at different desired intervals. This floating roller cam arrangement assures extremely equal activation and minimum bearing wear. The plunger is engaged by the cam rollers to move straight outward causing separation of the ignition points with very slight pressure of the plunger along the sides of the bearing bracket.

While I have described a preferred construction in some detail, it should be regarded by way of illustration and example rather than as a restriction or limitation thereof, as many changes in the construction, combination and arrangement of the parts may be made without departing from the spirit and scope of the invention.

I claim:

In an ignition breaker cam structure, a rotatable shaft and a fixed housing through which it extends, a driving member having a sleeve portion fixed to the shaft within the housing having a flange at the bottom of the housing, projections extending upwardly therefrom at a spaced distance from the sleeve, an inner bearing sleeve fitting around the sleeve secured to the shaft and engaging the flange thereof, a bearing cam driver comprising a sleeve portion with longitudinal bearing slots fitting around the outside of the inner bearing sleeve, an outer bearing sleeve fitting around the outside of the driving member, a plurality of roller bearing members fitting in the slots of the driver member and of a diameter to engage the inner and outer bearing sleeves while positioned in the slots of the driver member, means for connecting the driver member for the bearing members with the driving member secured to the shaft, means connected to the outer bearing member for engaging the bottom of the housing to prevent the rotation of the outer bearing member, the bearing member driver and the bearing rollers being rotatable with the shaft within the outer bearing member, the outer bearing member having an opening therethrough through which to engage each of the roller bearing members as they are rotated.

References Cited in the file of this patent

UNITED STATES PATENTS

| 816,083 | Farwell | Mar. 27, 1906 |
| 915,391 | Varley | Mar. 16, 1909 |
| 1,268,716 | Holliday | June 4, 1918 |
| 1,480,546 | Cumminsky | Jan. 15, 1924 |
| 2,384,828 | Fuston | Sept. 18, 1945 |

FOREIGN PATENTS

| 214,024 | Switzerland | June 16, 1941 |